United States Patent
Spieker et al.

(10) Patent No.: US 10,799,858 B2
(45) Date of Patent: Oct. 13, 2020

(54) PROCESS FOR MANAGING SULFUR COMPOUNDS ON CATALYST

(71) Applicant: UOP LLC, Des Plaines, IL (US)

(72) Inventors: Wolfgang A. Spieker, Glenview, IL (US); Gregory J. Gajda, Mount Prospect, IL (US); J. W. Adriaan Sachtler, Des Plaines, IL (US); Kristoffer E. Popp, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 49 days.

(21) Appl. No.: 15/917,297

(22) Filed: Mar. 9, 2018

(65) Prior Publication Data
US 2019/0275508 A1 Sep. 12, 2019

(51) Int. Cl.
*B01J 38/10* (2006.01)
*C07B 35/04* (2006.01)
*B01J 23/96* (2006.01)
*B01J 23/42* (2006.01)

(52) U.S. Cl.
CPC .............. *B01J 38/10* (2013.01); *B01J 23/42* (2013.01); *B01J 23/96* (2013.01); *C07B 35/04* (2013.01)

(58) Field of Classification Search
CPC .. B01J 38/10; B01J 23/42; B01J 23/96; C07B 35/04
USPC .......................................................... 502/53
See application file for complete search history.

(56) References Cited

U.S. PATENT DOCUMENTS

| | | | |
|---|---|---|---|
| 3,720,602 A | 3/1973 | Riley et al. | |
| 3,907,921 A | 9/1975 | Winter | |
| 4,191,633 A | 3/1980 | Dauber | |
| 4,377,495 A * | 3/1983 | Tse | B01J 23/96 208/140 |
| 4,395,325 A * | 7/1983 | McGovern | C10G 11/187 208/113 |
| 5,689,033 A | 11/1997 | Forte et al. | |
| 5,756,414 A | 5/1998 | Huang et al. | |
| 5,880,050 A | 3/1999 | Boitiaux et al. | |
| 7,666,198 B2 | 2/2010 | Meier et al. | |
| 8,889,579 B2 | 11/2014 | Leonard et al. | |
| 2003/0194356 A1 | 10/2003 | Meier et al. | |
| 2013/0252801 A1* | 9/2013 | Leonard | B01J 23/96 502/53 |
| 2014/0274673 A1 | 9/2014 | Kauffman et al. | |

FOREIGN PATENT DOCUMENTS

| | | |
|---|---|---|
| CN | 104107704 B | 9/2016 |
| EP | 2109502 A2 | 10/2009 |
| RU | 2042426 C1 | 8/1995 |
| WO | 2013142044 A2 | 9/2013 |

OTHER PUBLICATIONS

U.S. Appl. No. 62/641,108, filed Mar. 9, 2018.
International Search Report and Written Opinion in PCT/US219/021396, dated Oct. 31, 2019, corresponding to current application.

* cited by examiner

Primary Examiner — Haytham Soliman

(57) ABSTRACT

A process is presented for the treatment of spent catalyst to manage sulfur-containing compounds on the catalyst. The catalyst may be a dehydrogenation catalyst, where sulfur accumulates during a dehydrogenation process. Sulfur compounds are stripped from the spent catalyst and the catalyst may be cooled before a regeneration step. The process includes controlling removal of sulfur compounds from the spent catalyst before regeneration.

20 Claims, 3 Drawing Sheets

PROCESS FOR MANAGING SULFUR COMPOUNDS ON CATALYST

FIELD OF THE INVENTION

The present invention relates to treating spent catalyst from a reaction zone, and in particular to the addition of a source of oxygen during the treating of spent catalyst from a reaction zone.

BACKGROUND OF THE INVENTION

Many catalytic hydrocarbon conversion processes require spent catalyst to be regenerated. By way of example, one such process is where light olefins can be produced through the dehydrogenation of light paraffins. The dehydrogenation of paraffins is performed in a catalytic process where a hydrocarbon stream comprising paraffins is contacted with a dehydrogenation catalyst in a reactor under dehydrogenation conditions to generate a light olefin product stream. The catalyst used in this process includes a catalytic metal on a support. The catalytic metal generally comprises a noble metal, such as platinum or palladium. The dehydrogenation process involves many reactions during the dehydrogenation process, the catalyst is slowly deactivated through the reaction process. One of the contributors to the deactivation is the generation of coke on the catalyst. The catalyst therefore, needs to be periodically regenerated to remain useful in the dehydrogenation process. Due to the high temperatures required to produce light olefins in the dehydrogenation reactors, a low level of $H_2S$ must be maintained in the reactor section to prevent the formation of metal-catalyzed coke. In the case of light paraffin dehydrogenation, the sulfur level is controlled by directly injecting a sulfur containing compound such as dimethyl disulfide into the reactor section with the hydrocarbon feed. Sulfur is known to passivate metal surfaces thus preventing metal catalyzed coke formation. The sulfur can be carried into the regenerator by catalyst and over time impact the catalyst performance. This control and regeneration of a catalyst is important for the lifespan of the catalyst and its usefulness in a catalytic process.

SUMMARY OF THE INVENTION

The present invention provides for improved sulfur-compound management in spent catalyst of a hydrocarbon conversion process. Sulfur-compounds are used for passivation of the metal surfaces to limit metal catalyzed coking of catalyst. However, sulfur-compounds accumulate on the catalyst and decrease activity and catalyst life. In some embodiments, the process includes managing the sulfur-compounds by removal of the sulfur-compounds from spent catalyst by passing the spent catalyst from the reaction zone to a sulfur stripping vessel. A combined stream comprising a gas and an oxygen source is passed to the sulfur stripping vessel to remove sulfur compounds from the spent catalyst to generate a stripped catalyst.

The combined stream of a gas stream and a stream comprising a source of oxygen provides oxygen in an amount of from about 1000 mol-ppm oxygen to about 20000 mol-ppm oxygen to the sulfur stripping vessel at sulfur stripping conditions. The combined stream is at a temperature ranging from about 100° C. to about 700° C.

The stripped catalyst stream may be passed to a cooling section wherein a cooling gas is passed over the catalyst. The catalyst may be cooled before sending the stripped catalyst to a regeneration unit. The stripped catalyst is passed to the regeneration unit, and the catalyst is regenerated. The regenerated catalyst is returned to the reaction zone. In one embodiment, the regenerated catalyst is introduced to a reduction zone where the regenerated catalyst is contacted with hydrogen to reduce the catalytic metals which are oxidized in the regenerator.

Other objects, advantages and applications of the present invention will become apparent to those skilled in the art from the following detailed description and drawings.

DETAILED DESCRIPTION OF THE INVENTION

Figure 1:
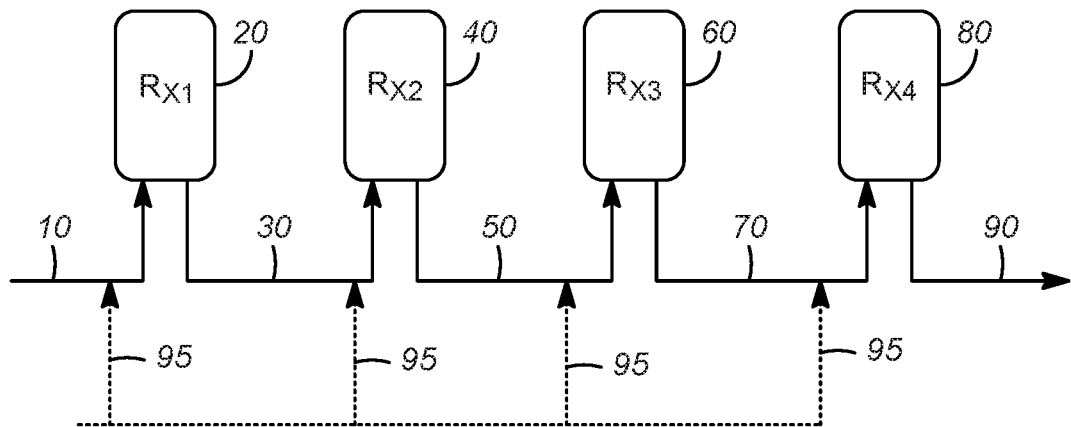
FIG. 1 illustrates a reaction zone comprising four reactors.

Catalysts are expensive and very sensitive to poisons. Poisons can accelerate the deactivation of the catalyst, and in some instances the deactivation is sufficient to require catalyst replacement. The controlling of the levels of catalyst poisons in a process can lead to increased catalyst life and improved productivity and generating catalyst savings. In particular, dehydrogenation catalysts that incorporate platinum (Pt) as the active metal component are sensitive to sulfur compounds. While platinum is referred to in the description, it is intended that any platinum group metal can be included in this description. Sulfur is a cause for the accelerated deactivation of dehydrogenation catalysts used in paraffin dehydrogenation, and in particular for platinum based catalysts. While the term sulfur is referred to in the description, the term is intended to encompass any sulfur containing compound. However, sulfur compounds are also used to passivate the metal surfaces to limit the metal catalyzed coking. The balance of passivation versus deactivation is important to maintain for the useful catalyst life. For example, during a dehydrogenation process, a small amount of sulfur compound is injected for passivation purposes. The sulfur compound will build up over time, and results in a significant sulfur concentration on the catalyst which can be as high as 0.1 wt. % to 1 wt. % on the spent catalyst, or more commonly in the range of 0.1 wt. % to 0.5 wt. % on the spent catalyst measured as a weight percent of sulfur on the spent catalyst. Consequently, sulfur compounds also need to be removed to limit the amount of sulfur compounds in the regenerator, reduction zone, and entering the reaction zone.

In a normal process, catalyst is continuously circulated between the reaction zone such as a dehydrogenation reaction zone described here as an example and the regenerator. The catalyst accumulates coke during the dehydrogenation process and the regenerator burns off the coke and the platinum is re-dispersed over the catalyst surface. Platinum re-dispersion is commonly carried out using a process referred to as oxy-chlorination, wherein the catalyst is contacted with a halogen containing gas at elevated temperatures. The halogen is usually chlorine. The sulfur that is present on the catalyst entering the regenerator is converted from sulfides to sulfates in the burn zone of the regenerator. It has been found that more severe conditions, i.e. higher temperatures and longer residence times, are required to strip sulfate from the catalyst as compared to sulfide using the same hydrogen rich stripping gas. It is therefore desirable to strip sulfur from the catalyst prior to oxygen exposure in the regenerator section where sulfur compounds are converted from sulfide to sulfate. The catalyst exiting the burn zone, and the platinum re-dispersion zone, have been observed to have sulfates present on the catalyst, and to have a surface enrichment of sulfur compounds. Sulfur compounds have also been observed to displace chlorides leading to skewed sulfur profiles and correlating to skewed chloride profiles. There is further evidence that the sulfur contributes to the migration of platinum on the catalyst surface by creating a concentration gradient during platinum re-dispersion. This bulk migration leads to platinum migration and accelerated deactivation of the catalyst.

The process often includes contacting the spent catalyst, prior to passing the catalyst to the regenerator, with a reduction zone effluent gas to adsorb chloride stripped from the catalyst in the reduction zone. This reduces the chloride load on the downstream chloride treater and increases the chloride treater adsorbent bed life.

Sulfur compounds that remain on the regenerated catalyst as the catalyst is lifted to the reduction zone are in the form of a sulfate and can be present in a relatively high concentration, ranging from 0.05 wt % to 1 wt % of the catalyst, or more commonly in the range from 0.05 wt % to 0.5 wt %. measured as weight percent sulfur on the spent catalyst. The sulfate can be reduced to a sulfide and then stripped off the catalyst with hydrogen if the catalyst is heated to an elevated temperature for a sufficient time. One problem with this process is that in the reduction zone, a substantial amount of water and hydrogen sulfide ($H_2S$) is generated. The water, when present in relatively high concentrations, contributes to platinum agglomeration, and the agglomeration reduces the activity of the catalyst. The water, when present in relatively high concentrations, may also impact the interaction of platinum with other catalytic components of the catalyst, adversely impacting the catalyst performance by decreasing activity or increasing side reactions such as coking.

The elevated $H_2S$ concentration in the reduction zone effluent may further degrade the catalyst if it is contacted with the spent catalyst to adsorb HCl that is liberated in the chlorination zone by further increasing the sulfur passed to the regenerator with the catalyst. The problems associated with stripping the sulfate from the catalyst in the reactor section are equally undesirable. One consequence is the potential for a local increase in $H_2S$ and water concentrations which can accelerate corrosion of process equipment and the accumulation of tramp, or undesirable stray, metals on the catalyst. In addition, the water generated by the reduction of sulfate can increase the chloride loss, and therefore increase the chloride concentration in the reactor effluent. This shortens the chloride treater life.

Sulfur is a necessary component of the feedstock, and the sulfur on the catalyst cannot be removed or reduced through simply eliminating the sulfur injection. Sulfur management is important for a long catalyst life. The present invention seeks to improve the sulfur management and avoids the problems associated with high sulfur concentrations in the regenerator and the reduction zone by stripping the sulfur from the spent catalyst before passing the spent catalyst to the regenerator. In some embodiments, the process comprises passing the spent catalyst to a sulfur stripping vessel. However, in some embodiments there is no stripper after the last reactor. In the embodiments with a stripper, a gas stream such as a hydrogen rich gas stream is passed to the stripping vessel at an elevated temperature to contact the catalyst and strip sulfur and sulfur compounds from the catalyst and generate a stripped spent catalyst. The stripped spent catalyst may be passed to a catalyst cooler to cool the stripped spent catalyst. The catalyst cooler has a cooled gas passed over the stripped spent catalyst to reduce the temperature of the catalyst before passing the stripped spent catalyst to the regenerator. The stripped spent catalyst is contacted with a regenerant in a regenerator to produce regenerated catalyst. The regenerated catalyst is returned to the reaction zone, such as a dehydrogenation reaction zone. The regenerated catalyst may be returned via a reduction zone which may be part of the reaction zone. The reduction zone returns any metal on the catalyst to its metallic state.

The spent catalyst is stripped with a heated gas stream, which may be a hydrogen rich gas stream such as a net gas stream. The hydrogen rich gas may contain greater than about 50 mol % hydrogen, or greater than about 80 mol % hydrogen, or greater than about 90 mol % hydrogen, or equal to or greater than about 92.5 mol % hydrogen. The temperature of the combined gas stream may be sufficient to bring the temperature in the sulfur stripping vessel to from about 100° C. to about 700° C.; or in another embodiment from about 100° C. to about 400° C.; or in another embodiment from about 170° C. to about 340° C.; or in another embodiment from about 240° C. to about 280° C.; or in another embodiment from about 350° C. to about 700° C.; or in another embodiment from about 430° C. to about 620° C.; or in another embodiment from about 510° C. to about 550° C.

A source of oxygen may be added to the gas stream to form a combined stream or may be independently introduced to the sulfur stripping vessel. Oxygen-containing components may react with hydrogen in the sulfur stripping vessel to form water, which in turn can react with the sulfur compounds present and remove them from the catalyst, or the oxygen-containing components may decompose and the resulting oxygen may react with sulfur compounds directly to remove the sulfur compound from the catalyst. Source of oxygen may be compounds which decompose in the sulfur stripping vessel to yield oxygen which is then available to react with the sulfur compounds present with the spent catalyst. The source of oxygen may be water. The water may be in the form of steam, condensate, demineralized steam, demineralized water, or any combination thereof. Other sources of oxygen include hydrocarbons that contain one or more oxygen atoms, generally known as oxygenates. Suitable examples include alcohols, aldehydes, ketones, ethers, carboxylic acids, esters, phenols, and phenolic esters. Specific examples include methanol, ethanol, acetone, and propanol. In a dehydrogenation process, those oxygenates of particular interest include those having the same carbon number as the hydrocarbon that is being dehydrogenated, so that the oxygenate decomposition product adds to the main process feed or product stream. For example, n-propanol may be a particularly suitable oxygen source in a propane dehydrogenation process. Similarly, iso-butanol or tert-butyl alcohol, or methyl ethyl ketone may be particularly suitable as an oxygen source for a butane dehydrogenation process. Sources of oxygen may be used in any combination. Examples of suitable sources of oxygen include those that react with hydrogen over the catalyst at sulfur stripping conditions to generate at least 50% of the theoretical yield of water from hydrodeoxygenation.

The concentration of the source of oxygen in the combined stream is sufficient to provide oxygen in the sulfur stripping vessel at sulfur stripping conditions in an amount of from about 1000 mol-ppm oxygen to about 20000 mol-ppm oxygen; or from about 2000 mol-ppm oxygen to about 20000 mol-ppm oxygen; or from about 4000 mol-ppm oxygen to about 16000 mol-ppm oxygen; or from about 8000 mol-ppm oxygen to about 12000 mol-ppm oxygen; or from about 1000 mol-ppm oxygen to about 8000 mol-ppm oxygen; or from about 2000 mol-ppm oxygen to about 6000 mol-ppm oxygen; or from about 3000 mol-ppm oxygen to about 5000 mol-ppm oxygen.

Further in another embodiment when the temperature of the combined gas stream is sufficient to bring the temperature in the sulfur stripping vessel to from about 100° C. to about 700° C. the concentration of the source of oxygen in the combined stream is sufficient to provide oxygen in the sulfur stripping vessel at sulfur stripping conditions in an amount from about 1000 mol-ppm oxygen to about 20000 mol-ppm oxygen. In another embodiment when the temperature of the combined gas stream is sufficient to bring the temperature in the sulfur stripping vessel to from about 100° C. to about 400° C. the concentration of the source of oxygen in the combined stream is sufficient to provide oxygen in the sulfur stripping vessel at sulfur stripping conditions in an amount from about 2000 mol-ppm oxygen to about 20000 mol-ppm oxygen. In another embodiment when the temperature of the combined gas stream is sufficient to bring the temperature in the sulfur stripping vessel to from about 170° C. to about 340° C. the concentration of the source of oxygen in the combined stream is sufficient to provide oxygen in the sulfur stripping vessel at sulfur stripping conditions in an amount from about 4000 mol-ppm oxygen to about 16000 mol-ppm oxygen. In another embodiment when the temperature of the combined gas stream is sufficient to bring the temperature in the sulfur stripping vessel to from about 240° C. to about 280° C. the concentration of the source of oxygen in the combined stream is sufficient to provide oxygen in the sulfur stripping vessel at sulfur stripping conditions in an amount from about 8000 mol-ppm oxygen to about 12000 mol-ppm oxygen. In another embodiment when the temperature of the combined gas stream is sufficient to bring the temperature in the sulfur stripping vessel to from about 350° C. to about 700° C. the concentration of the source of oxygen in the combined stream is sufficient to provide oxygen in the sulfur stripping vessel at sulfur stripping conditions in an amount from about 1000 mol-ppm oxygen to about 8000 mol-ppm oxygen. In another embodiment when the temperature of the combined gas stream is sufficient to bring the temperature in the sulfur stripping vessel to from about 430° C. to about 620° C. the concentration of the source of oxygen in the combined stream is sufficient to provide oxygen in the sulfur stripping vessel at sulfur stripping conditions in an amount from about 2000 mol-ppm oxygen to about 6000 mol-ppm oxygen. In another embodiment when the temperature of the combined gas stream is sufficient to bring the temperature in the sulfur stripping vessel to from about 510° C. to about 550° C. the concentration of the source of oxygen in the combined stream is sufficient to provide oxygen in the sulfur stripping vessel at sulfur stripping conditions in an amount from about 3000 mol-ppm oxygen to about 5000 mol-ppm oxygen.

The sulfur stripping vessel conditions are selected to have the catalyst reside in the sulfur stripping vessel at a sufficiently high temperature to reduce and remove at least 90% of the sulfur compounds from the catalyst. The residence time in the stripping vessel is related to the temperature for stripping, where as the stripping temperature is increased, the residence time can be reduced. After stripping the catalyst for a sufficient time in the sulfur stripping vessel, the catalyst may be passed to a catalyst cooling unit. The catalyst is typically cooled to a temperature less than 300° C. to protect downstream catalyst handling equipment. Preferably, the catalyst is cooled to a temperature between 100° C. and 150° C. In another embodiment, a cooling zone may be incorporated into the sulfur stripping vessel.

While the stripping and cooling can be performed with different vessels, combining the sections into a single vessel allows for better material handling and reduces the number of process vessels that must be purchased and maintained. When retrofitting of existing dehydrogenation processes separate vessels can be used, where an additional vessel or two can be added at the catalyst outlet of the last reactor in the dehydrogenation reactor system.

In one embodiment, the process includes passing the stripped spent catalyst to a vessel containing a cooling zone, where the catalyst is contacted with a reduction zone effluent. The stripped spent catalyst adsorbs chloride that had been liberated in the reduction zone. While chloride ions are the main halogen ions liberated in this zone, other halogen ions that might be present can also be adsorbed and removed from the catalyst. The stripped and cooled spent catalyst is then passed to the regenerator along with the adsorbed chloride or alternative halogen.

The reaction zone of the process can be seen in FIG. 1. For ease of understanding, the process is described in terms of an exemplary process which is a dehydrogenation process. It is understood that other conversion processes are included within the scope of the invention. A dehydrogenation process may comprise a reaction zone having plurality of dehydrogenation reactors, such as two or three or four, or a single dehydrogenation reactor. The discussion herein is directed to a specific embodiment shown in FIG. 1 which has a reaction zone comprising four reactors. The system, and process, typically utilizes moving bed reactor system, where catalyst flows through the reactors. The catalyst upon leaving a reactor is collected and passed to a subsequent reactor in a reactor system. The catalyst leaving the last reactor is collected and passed to a regeneration system. The example illustrated in FIG. 1 has four reactors. The feed 10 enters the first reactor 20 to produce a first effluent stream 30. The product stream 30 enters the second reactor 40 to produce the second effluent stream 50. The second product stream 50 enters the third reactor 60 to produce the third effluent stream 70. The third product stream 70 enters the fourth reactor 80 to produce the product stream 90. FIG. 1 also shows an optional embodiment wherein an oxygen source such as water may be introduced to one or more of the feeds to the reactors in any combination. Water may be in the form of stream, condensate, demineralized water, or demineralized steam.

Figure 2:
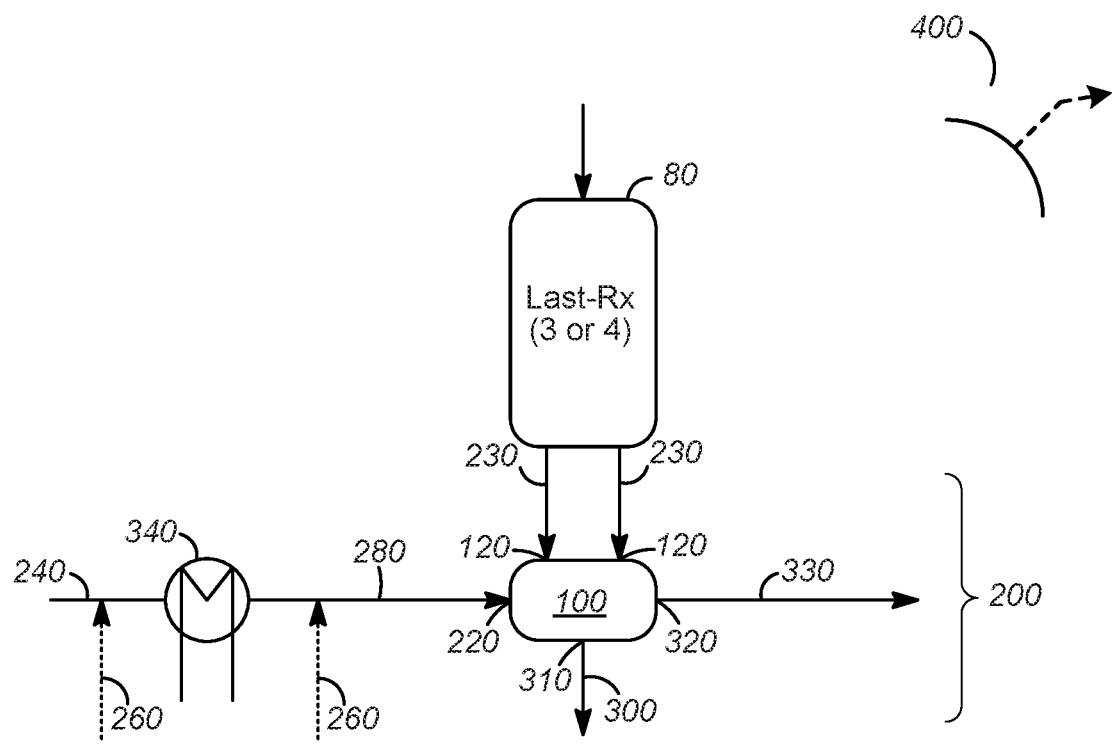
FIG. 2 illustrates introduction of a combined stream containing a source of oxygen, such as water, to the stripper.

As shown in FIG. 2, before passing the spent catalyst to the regeneration system, the spent catalyst leaving the last reactor may be passed to a stripping zone 200 comprising sulfur stripping vessel 100. Sulfur stripping vessel 100 may have been a catalyst collector that has been modified for treatment of the spent catalyst to strip sulfur before passing the spent catalyst to the regenerator. The sulfur stripping vessel 100 shown in FIG. 2 is a specific embodiment where the sulfur stripping vessel comprises a stripping zone and a cooling zone. The sulfur stripping vessel 100 is positioned in fluid communication with the catalyst outlet from the last reactor 80 via lines 230. Spent catalyst is passed into the sulfur stripping vessel 100 through one or more catalyst entry ports 120, and flows downward into the sulfur stripping vessel 100 through the stripping zone of the vessel first and then through the cooling zone of the vessel. A substantially sulfur-free gas 240 is combined with a stream comprising an oxygen source 260 to form a combined stream 280 which is passed through the stripping gas port 220 and into the sulfur stripping vessel 100. Two locations are shown for the combination of the gas in 240 and the stream comprising an oxygen source in 260. For ease of understanding the substantially sulfur-free gas is referred to in this discussion as an exemplary hydrogen rich gas and the stream comprising an oxygen source is referred to as an exemplary water stream. The combined stream introduced to the stripping zone of the sulfur stripping vessel 100 operates to remove a portion of the sulfur compounds present on the spent catalyst. Preferably, the substantially sulfur free hydrogen rich gas has less than 100 ppm by vol. $H_2S$. The resulting stripped catalyst flows to the cooling zone of the sulfur stripping vessel. A cooling gas is passed to the cooling section through a cooling gas port, and flows over the catalyst to cool the catalyst (not shown). The cooled catalyst is passed out the cooled catalyst port 310 into line 300 and is passed to a catalyst regenerator (not shown) The combined stripping gas and cooling zone effluent is passed out of the vessel through a gas exit port 320 and removed in line 330. The catalyst is regenerated in the regenerator (not shown) and passed back to the reaction zone. The catalyst may be passed back to any or all the reactors in the reaction zone. The catalyst may first pass through a reduction zone that may be part of the reaction zone. The stripping gas and cooling gas effluents may be combined within the sulfur stripping vessel 100 and removed as a single effluent though a single port as shown 320,330, or the effluents may be combined externally to the sulfur stripping vessel 100, wherein the vessel includes multiple gas outlets.

The gas stream 240 may be a hydrogen rich gas stream generated by the dehydrogenation process and can be heated to a desired temperature prior to passing the gas stream to the sulfur stripping vessel 100. This heating is shown by way of example as the heat exchanger 340 of FIG. 2. The heating may take place before or after the gas stream 240 is combined with the stream comprising an oxygen-source 260. Other gas streams beside a hydrogen stream maybe used as the gas stream 240 such as a net gas stream. In an alternative embodiment, the gas stream can be an effluent gas from the reduction zone if the spent catalyst has been sulfur stripped. The cooling gas may be hydrogen generated by the process such as the dehydrogenation process, and can be cooled to a desired temperature prior to passing the cooling gas to the cooling zone of sulfur stripping vessel 100. In an alternative embodiment, the cooling gas can be an effluent gas from the reduction zone.

After the regenerator, the regenerated catalyst may be passed to the reduction zone prior to being passed to the reactors of the reaction zone. The reduction zone may be part of the reaction zone or may be external to the reaction zone. The purpose of the reduction zone is to reduce the catalytic metal on the catalyst prior to passing the catalyst to the reactors of the reaction zone. Excess halogens may be stripped from the catalyst in the reduction zone. Typically, excess chloride is stripped in the form of HCl. By directing the reduction zone effluent gas to the cooling zone, the chloride may be adsorbed on the stripped spent catalyst.

In another embodiment, an oxygen source such as water may be additionally introduced to the process at other locations such as in the reaction zone in addition to the sulfur stripping vessel. In the reaction zone, the oxygen source such as water may be introduced to any combination including all reactors in the reaction zone, and may be incorporated into the feed stream to any combination including all the reactors in the reaction zone. Optional embodiments further include directing a reduction zone effluent to combine with the reactor effluent without contacting the spent catalyst, or directing the effluent gas from the sulfur stripping vessel and the cooling zone to combine with the reactor effluent, or to combine with the feed to upstream reactor.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof; the specification is not intended to be limiting in this respect. Shown as 400 of FIG. 2.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein. Shown as 400 of FIG. 2.

By way of example, when water is used at the oxygen source, sensors and measurements as to the concentration of oxygen or water in various streams may be employed. Similarly, when an oxygenate is used at the oxygen source, sensors and measurements as to the concentration of oxygen in various streams may employed Sensors and measurements of sulfur compounds in various vessels, stream or catalyst may be employed. Further, sensors and measurements as to the concentration of sulfur on the stripped spent catalyst may be employed. Control of a flow control valve on the oxygen source may be employed. Such control may be correlated to the sensing or measurement of one or more parameters.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims. In the foregoing, all temperatures are set forth in degrees Celsius and, all parts and percentages are by weight, unless otherwise indicated.

Example

Figure 3:
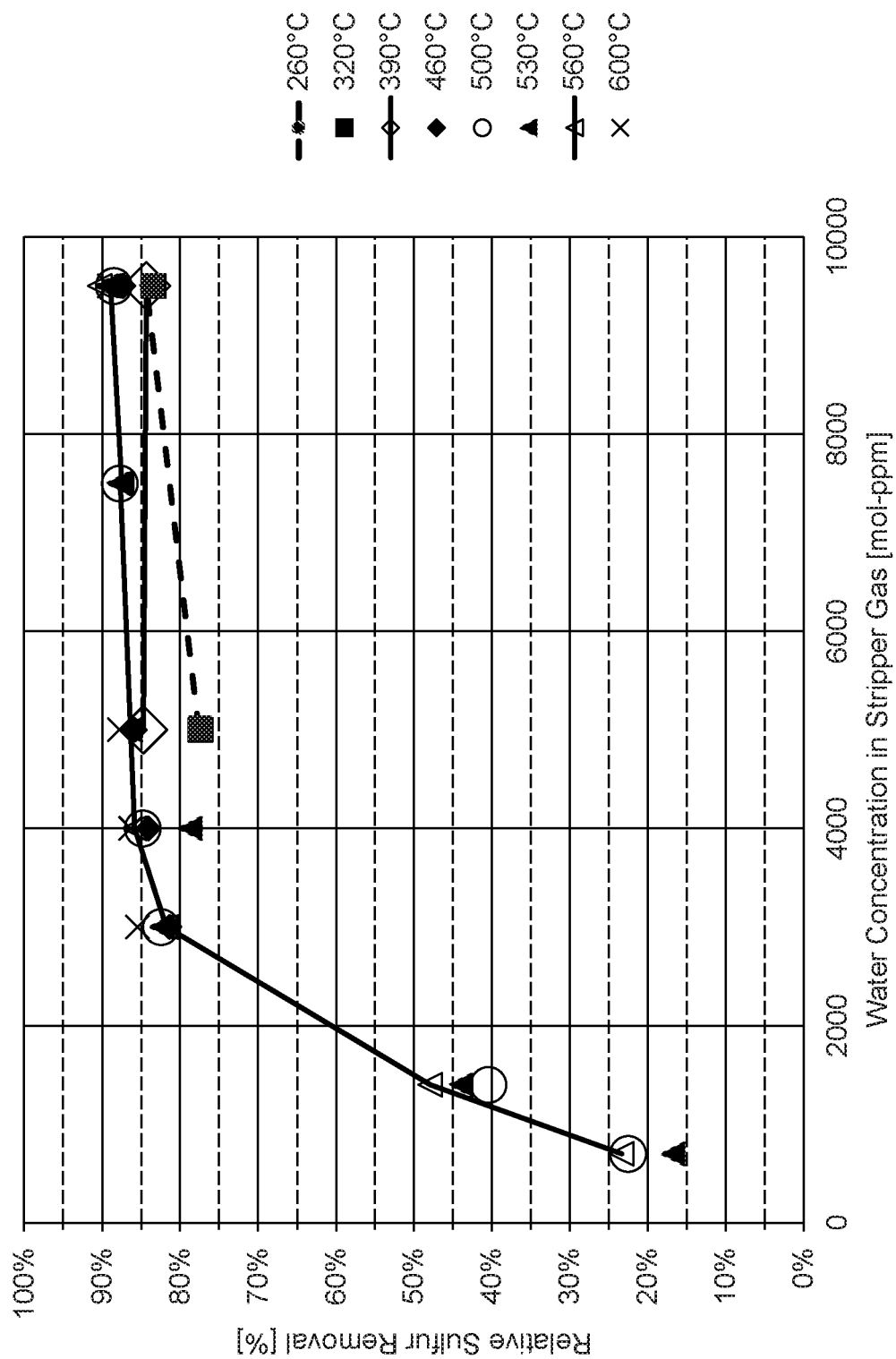
FIG. 3 illustrates the effects of introducing a combined stream containing water to the sulfur stripping vessel as per the example.

A baseline sulfur measurement of a first spent dehydrogenation catalyst was determined using UOP Method Number 864 Sulfur in Organic and Inorganic Materials by Combustion and IR Detection. A quartz vessel was loaded with 1.5 cc of the first regenerated dehydrogenation catalyst. After a period of dehydrogenation conditions with sulfur present, a stripping gas of hydrogen and a first concentration of water was introduced to the vessel at a flowrate of 12.86 sccm (514/h GHSV) where the standard cubic centimeters per second is at 20° C. and 1 atm, while the vessel was at a first temperate. The flowing contact was continued for a period of 1.5 hours. The flow was discontinued and the vessel brought to ambient temperature. The catalyst was then removed and analyzed for sulfur using UOP Method Number 864 Sulfur in Organic and Inorganic Materials by Combustion and IR Detection. The relative amount of sulfur removed from the spent catalyst was calculated using the baseline sulfur measurement and the sulfur measurement after exposure to stripping gas. The experiment was repeated at various concentrations of water in the stripping gas, and at various temperatures of the vessel. The results are shown in the plot of FIG. 3. The entire procedure was repeated using a second spent dehydrogenation catalyst at different conditions, and the results are shown in the plot of FIG. 4.

Figure 4:
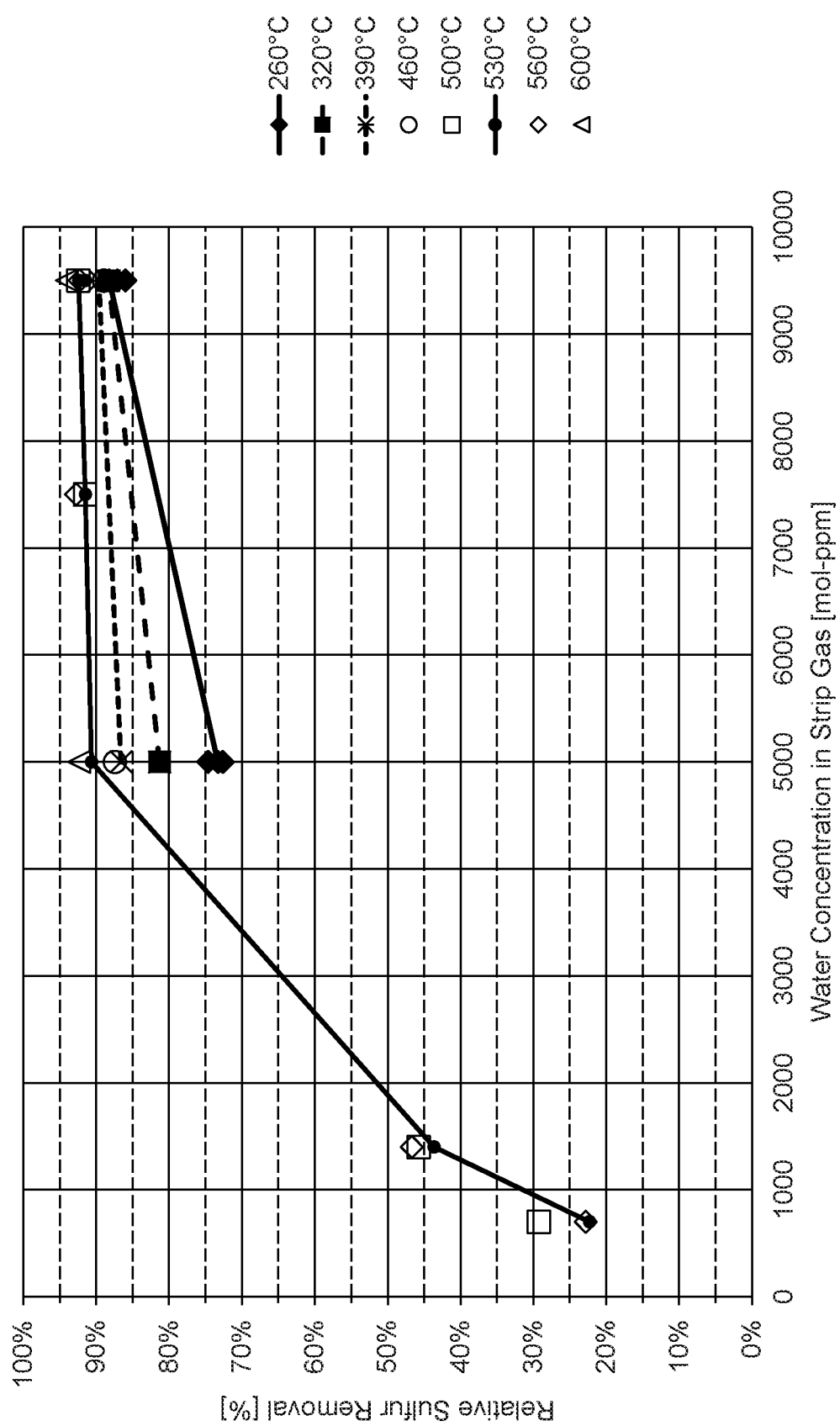
FIG. 4 also illustrates the effects of introducing a combined stream containing water to the sulfur stripping vessel as per the example.

FIG. 3 and FIG. 4 show that one-pass sulfur removal rates of 85 to 95%, starting from about 2000 to 4000 wt-ppm sulfur on catalyst, can be achieved at catalyst residence times of approximately 1.5 hours and GHSV of approx. 500/h. For example, at an exemplary 530° C. sulfur stripping vessel temperature, an oxygen concentration of approx. 5000 mol-ppm provides 85 to 95% sulfur removal. At lower sulfur stripping vessel temperatures, such as in retrofit applications where physical constraints may prevent installation of a catalyst cooling section downstream of the sulfur stripping vessel thereby requiring that the sulfur striping vessel also function as a catalyst cooler, higher oxygen concentrations may be required. For example, at a 260° C. sulfur striping vessel temperature, an oxygen concentration of at least 9000 mol-ppm is required to achieve 85-95% sulfur removal.

Specific Embodiments

While the following is described in conjunction with specific embodiments, it will be understood that this description is intended to illustrate and not limit the scope of the preceding description and the appended claims.

A first embodiment of the invention is a process for treating spent catalyst from a reaction zone comprising (a) passing the spent catalyst to a sulfur stripping vessel, wherein the spent catalyst comprises at least one sulfur-containing compound; (b) combining a gas stream and a stream comprising a source of oxygen to form a combined stream wherein the combined stream provides oxygen in an amount of from about 1000 mol-ppm oxygen to about 20000 mol-ppm oxygen in the sulfur stripping vessel at sulfur stripping conditions; (c) passing the combined stream to the sulfur stripping vessel at a temperature sufficient to result in the sulfur stripping vessel operating at from about 100° C. to about 700° C. and contacting oxygen generated from the combined stream with the spent catalyst and generate stripped spent catalyst; (d) passing the stripped spent catalyst to a regenerator to provide a regenerated catalyst; and (e) returning the regenerated catalyst to the reaction zone. An embodiment of the invention is one, any or all of prior embodiments in this paragraph up through the first embodiment in this paragraph wherein the gas stream comprises hydrogen. An embodiment of the invention is one, any or all of prior embodiments in this paragraph up through the first embodiment in this paragraph wherein the source of oxygen is water. An embodiment of the invention is one, any or all of prior embodiments in this paragraph up through the first embodiment in this paragraph wherein the source of oxygen is an oxygenate. An embodiment of the invention is one, any or all of prior embodiments in this paragraph up through the first embodiment in this paragraph wherein the combined stream provides oxygen in an amount of from about 2000 mol-ppm oxygen to about 20000 mol-ppm in a sulfur stripping vessel at sulfur stripping conditions. An embodiment of the invention is one, any or all of prior embodiments in this paragraph up through the first embodiment in this paragraph wherein the passing the combined stream to the sulfur stripping vessel is at a temperature sufficient to result in the sulfur stripping vessel operating at from about 100° C. to about 400° C. An embodiment of the invention is one, any or all of prior embodiments in this paragraph up through the first embodiment in this paragraph wherein the combined stream provides oxygen in an amount of from about 1000 mol-ppm oxygen to about 8000 mol-ppm in a sulfur stripping vessel at sulfur stripping conditions. An embodiment of the invention is one, any or all of prior embodiments in this paragraph up through the first embodiment in this paragraph wherein the passing the combined stream to the sulfur stripping vessel is at a temperature sufficient to result in the sulfur stripping vessel operating at from about 350° C. to about 700° C. An embodiment of the invention is one, any or all of prior embodiments in this paragraph up through the first embodiment in this paragraph wherein the combined stream provides oxygen in an amount of from about 4000 mol-ppm oxygen to about 16000 mol-ppm in a sulfur stripping vessel at sulfur stripping conditions. An embodiment of the invention is one, any or all of prior embodiments in this paragraph up through the first embodiment in this paragraph wherein the passing the combined stream to the sulfur stripping vessel is at a temperature sufficient to result in the sulfur stripping vessel operating at from about 170° C. to about 340° C. An embodiment of the invention is one, any or all of prior embodiments in this paragraph up through the first embodiment in this paragraph wherein the combined stream provides oxygen in an amount of from about 1000 mol-ppm oxygen to about 8000 mol-ppm in a sulfur stripping vessel at sulfur stripping conditions. An embodiment of the invention is one, any or all of prior embodiments in this paragraph up through the first embodiment in this paragraph wherein the passing the combined stream to the sulfur stripping vessel is at a temperature sufficient to result in the sulfur stripping vessel operating at from about 430° C. to about 620° C. An embodiment of the invention is one, any or all of prior embodiments in this paragraph up through the first embodiment in this paragraph further comprising cooling the stripped spent catalyst prior to passing the stripped spent catalyst to the regenerator to provide the regenerated catalyst. An embodiment of the invention is one, any or all of prior embodiments in this paragraph up through the first embodiment in this paragraph wherein the stripped spent catalyst comprises no more than about 50 mass-% of the sulfur-containing compounds of the spent catalyst. An embodiment of the invention is one, any or all of prior embodiments in this paragraph up through the first embodiment in this paragraph wherein the reaction zone comprises from one to five reactors. An embodiment of the invention is one, any or all of prior embodiments in this paragraph up through the first embodiment in this paragraph wherein the reaction zone comprises from three to four reactors. An embodiment of the invention is one, any or all of prior embodiments in this paragraph up through the first embodiment in this paragraph wherein the reaction zone is a dehydrogenation reaction zone, and the spent catalyst is a dehydrogenation catalyst. An embodiment of the invention is one, any or all of prior embodiments in this paragraph up through the first embodiment in this paragraph wherein the stripped spent catalyst is contacted with a regenerant in the regenerator to produce the regenerated catalyst. An embodiment of the invention is one, any or all of prior embodiments in this paragraph up through the first embodiment in this paragraph, further comprising at least one of sensing at least one parameter of the process and generating a signal or data from the sensing; generating and transmitting a signal; or generating and transmitting data. An embodiment of the invention is one, any or all of prior embodiments in this paragraph up through the first embodiment in this paragraph wherein the parameter is the concentration of sulfur in the stripped spent catalyst.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for treating spent catalyst from a reaction zone comprising:
   (a) passing the spent catalyst to a sulfur stripping vessel, wherein the spent catalyst comprises at least one sulfur-containing compound;
   (b) combining a hydrogen rich gas stream and a stream consisting essentially of a source of oxygen to form a combined stream wherein the combined stream provides oxygen in an amount of from about 1000 mol-ppm oxygen to about 20000 mol-ppm oxygen in the sulfur stripping vessel at sulfur stripping conditions;
   (c) passing the combined stream to the sulfur stripping vessel at a temperature sufficient to result in the sulfur stripping vessel operating at from about 100° C. to about 700° C. and contacting oxygen generated from the combined stream with the spent catalyst and generate stripped spent catalyst;
   (d) passing the stripped spent catalyst to a regenerator to provide a regenerated catalyst; and
   (e) returning the regenerated catalyst to the reaction zone.

2. The process of claim 1 wherein the gas stream comprises hydrogen.

3. The process of claim 1 wherein the source of oxygen is water.

4. The process of claim 3 wherein the source of oxygen is an oxygenate.

5. The process of claim 1 wherein the combined stream provides oxygen in an amount of from about 2000 mol-ppm oxygen to about 20000 mol-ppm in a sulfur stripping vessel at sulfur stripping conditions.

6. The process of claim 5 wherein the passing the combined stream to the sulfur stripping vessel is at a temperature sufficient to result in the sulfur stripping vessel operating at from about 100° C. to about 400° C.

7. The process of claim 1 wherein the combined stream provides oxygen in an amount of from about 1000 mol-ppm oxygen to about 8000 mol-ppm in a sulfur stripping vessel at sulfur stripping conditions.

8. The process of claim 7 wherein the passing the combined stream to the sulfur stripping vessel is at a temperature sufficient to result in the sulfur stripping vessel operating at from about 350° C. to about 700° C.

9. The process of claim 1 wherein the combined stream provides oxygen in an amount of from about 4000 mol-ppm oxygen to about 16000 mol-ppm in a sulfur stripping vessel at sulfur stripping conditions.

10. The process of claim 9 wherein the passing the combined stream to the sulfur stripping vessel is at a temperature sufficient to result in the sulfur stripping vessel operating at from about 170° C. to about 340° C.

11. The process of claim 1 wherein the combined stream provides oxygen in an amount of from about 1000 mol-ppm oxygen to about 8000 mol-ppm in a sulfur stripping vessel at sulfur stripping conditions.

12. The process of claim 11 wherein the passing the combined stream to the sulfur stripping vessel is at a temperature sufficient to result in the sulfur stripping vessel operating at from about 430° C. to about 620° C.

13. The process of claim 1 further comprising cooling the stripped spent catalyst prior to passing the stripped spent catalyst to the regenerator to provide the regenerated catalyst.

14. The process of claim 1 wherein the stripped spent catalyst comprises no more than about 50 mass-% of the sulfur-containing compounds of the spent catalyst.

15. The process of claim 1 wherein the reaction zone comprises from one to five reactors.

16. The process of claim 1 wherein the reaction zone comprises from three to four reactors.

17. The process of claim 1 wherein the reaction zone is a dehydrogenation reaction zone, and the spent catalyst is a dehydrogenation catalyst.

18. The process of claim 1 wherein the stripped spent catalyst is contacted with a regenerant in the regenerator to produce the regenerated catalyst.

19. The process of claim 1, further comprising at least one of:
   sensing at least one parameter of the process and generating a signal or data from the sensing;
   generating and transmitting a signal; or
   generating and transmitting data.

20. The process of claim 19 wherein the parameter is the concentration of sulfur in the stripped spent catalyst.

* * * * *